Dec. 9, 1941.  J. W. SIMPSON  2,265,703
TUBULAR FITTING AND NUT
Filed March 4, 1939

Inventor
James W. Simpson
By Cushman, Darby, Cushman
Attorney

Patented Dec. 9, 1941

2,265,703

UNITED STATES PATENT OFFICE 2,265,703

TUBULAR FITTING AND NUT

James W. Simpson, Decatur, Ill., assignor to Mueller Co., Decatur, Ill., a corporation of Illinois Application March 4, 1939, Serial No. 259,872

1 Claim. (Cl. 285—55)

The present invention relates to a tubular fitting adapted to be secured in an opening in the wall of a chamber to make a connection for flow of fluid therewith, and a nut thereon adapted to compress a sealing member surrounding the fitting into sealing engagement around the opening in the wall of the chamber, the nut being designed to present maximum wrench receiving surfaces while being capable of maximum translational movement along the fitting.

In the drawing which is illustrative of the preferred form of the nut, which drawing is illustrative and is not intended to restrict the invention to any specific design:

The nut of the present invention is an improvement over that shown in the patent of Frank H. Mueller et al. No. 2,199,647, dated May 7, 1940. The said Mueller et al. application discloses a fitting which is adapted to be threaded through the wall of a conduit, and a deformable sealing ring around the fitting, which ring is compressed against the outer wall of the conduit by a follower nut mounted on the fitting, to thereby deform the sealing ring to the shape of the conduit, resulting in the formation of a tight seal at the junction of the fitting with the conduit. The construction of the sealing ring is such that when it is compressed against the union of the conduit and fitting, the packing within the ring remains completely confined by a carrier of thin deformable material, the packing being forced against the walls of the fitting and the conduit.

Figure 1:
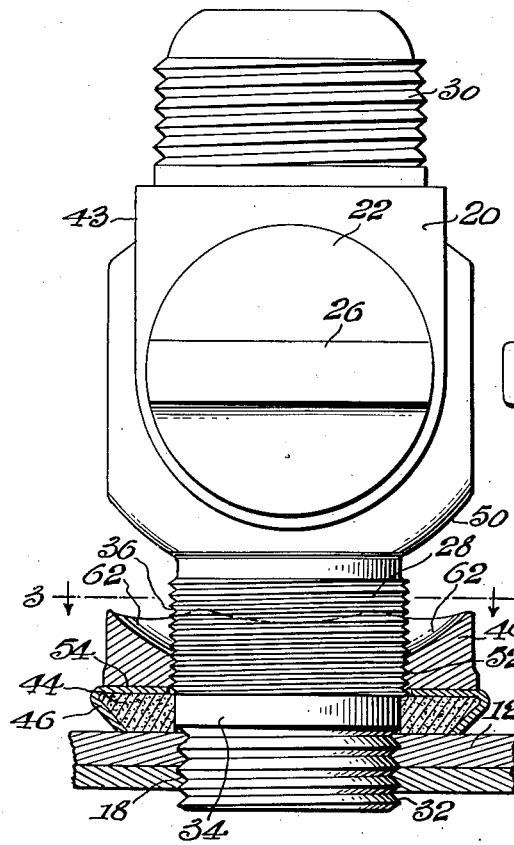
Figure 1 is a side elevational view partly in section, showing the fitting applied to a cylindrical conduit, the section of the conduit shown being taken longitudinally thereof.

In Figure 1, the conduit is shown at 12, said conduit being usually a thin steel pipe. When it is desired to make a connection with the conduit, an opening 18 is drilled through the wall of the conduit, and this opening is tapped to form pipe threads.

The fitting is then threaded into this opening, and in the present application it comprises a valve body 20 having therein a rotatable valve 22 provided with the usual flow passages which can be turned to open or closed position by means of the extension 26 which protrudes beyond the body.

The fitting has a lower nipple 28 and an upper nipple 30, which nipples have bores or passages for flow of fluid controlled by the valve member 22.

The lower nipple 28 is suitably equipped for connection with the curved wall of the conduit by pipe threads 32 adapted to coact with the threads in the opening 18. Above the area of the threads 32, the nipple has a relatively smooth narrow cylindrical portion 34 constituting a sealing wall.

Above the area 34, the nipple 28 is provided on its exterior surface with a length of machine threads 36, of shorter pitch than the threads 32. Said threads coact with similar machine threads on the interior of a follower nut 40, which is mounted on the outside of the nipple, and serves to compress the sealing ring in a manner described in the patent of Mueller et al. referred to above.

The valve body 20 is conveniently made integral with the nipple 28, and is of conventional construction, but made heavy enough to withstand installation strains. Any appropriate type of connection may be provided on the nipple 30 for attachment with a branch pipe line. The valve body has flattened portions 43 to receive a wrench for use during the threading of the fitting 28 to the conduit.

Figure 2:
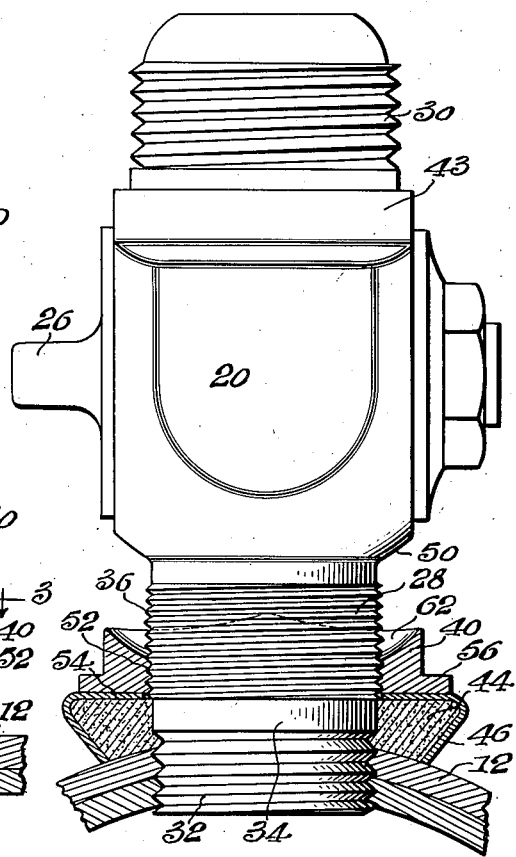
Figure 2 is another side elevational view of the fitting and nut, partly in section, at right angles to that of Figure 1, the section being taken transversely of the cylindrical conduit to which the fitting is applied.

As shown in Figures 1 and 2, the sealing member comprises a ring of compressible packing material 44, such as rubber, and a hollow ring-shaped carrier of thin deformable metal 46 for housing said packing ring. The carrier may be of copper or other similar thin material of sufficient strength, yet which can be deformed to take the shape of the curved surface of the chamber to which the fitting is attached.

As described in the patent of Mueller et al., when the hole has been cut and the pipe threads are tapped in the conduit, the fitting is threaded therein with the sealing member surrounding the nipple 28 and with the follower nut in place between the sealing member and the enlargement on the fitting constituting the valve body 20. It is desirable to have the area of the threads 36 on the exterior of the nipple 28 of such extent that the follower nut may be backed off far enough so that the sealing member can be spaced from the outside wall of the conduit at the termination of the insertion of the fitting into the opening in the conduit. This is desirable to permit removal of any metal cuttings incident to insertion of the fitting, which cuttings can be brushed away so that the sealing ring will engage a smooth surface. On the other hand, it is not desirable to have the length of the fitting between the conduit and the valve body too great, as these fittings are often installed in confined places. Furthermore, any extensive length of pipe between the conduit and the valve body might weaken the connection with the conduit by increasing the moment of forces applied incident to opening and closing the valve 22.

The nipple 28 is threaded into the openings 18 until the lower edge of the flat surface 34 on the outside of the nipple is in line with the outer face of the conduit as shown in Figure 1. The follower nut 40 is then tightened up along the threads 36, engaging the deformable sealing member and compressing it against the outer wall of the conduit, forcing the sealing member to take the curvature of the outer wall of the conduit.

The follower nut is tightened up as far as desired, usually until its lower face is at the bottom of the threads 36 on the nipple 28, and at this time the sealing member will have been distorted until it takes the shape of the outer wall of the conduit. When pressure is thus applied to the sealing member, it accommodates itself to the different curvatures of the outer wall of the conduit, as shown by comparison of Figures 1 and 2.

Figure 3:
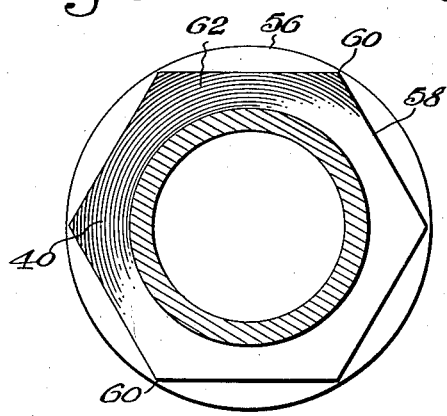
Figure 3 is a horizontal sectional view of the fitting, taken along the line 3—3 of Figure 1.

Referring to Figure 1, the valve body 20 presents a substantially spherical enlargement 50 rearwardly and spaced from the securing end of the nipple 28. The threads 36 are disposed on the nipple 28 intermediate the connecting end of the nipple and the enlargement 50. The nut 40 has inside treads 52 which cooperate with the threads 36 on said fitting. It also has a flat forward force applying end 54 which is formed in part by the flange 56 extending around the forward end of the nut. As shown in Figure 3, the nut is hexagonal in cross section having flat wrench receiving side faces 58 bounded by common junction lines 60 extending between the ends of the nut and lengthwise thereof.

As shown more particularly in Figures 1 and 3, the rearward end of the nut is dished out or concave as at 62, in such manner that it fits and can receive the convex spherical enlargement 50 presented by the forward end of the valve body 20. The concavity 62 extends outwardly and joins with all of the wrench receiving side faces 58 of the nut. The rearward edges 64 of the side faces 58 of the nut are arched in form where they join with the concavity 62, and the height of each of the side faces of the nut is greatest at each of the junction lines 60, and least at points intermediate said junction lines, as apparent in Figure 4.

Figure 4:
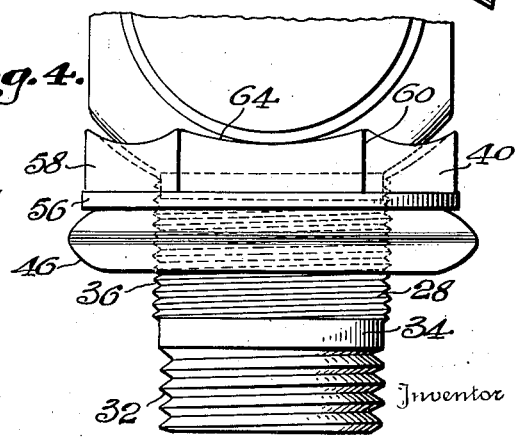
Figure 4 is a side elevational view of the fitting, nut and sealing member, showing the nut in its retracted position.

When the fitting is threaded into the conduit, the assembly is in the condition shown in Figure 4, with the sealing member in position on the nipple 28 forwardly of the follower nut 40. By reason of the concave rearward end of the follower nut, the same can be retracted a maximum distance rearwardly, said concave portion permitting the nut to be moved backwardly over the enlargement 50 on the fitting. Thus, when the fitting is threaded into the conduit, the sealing ring will be spaced from the outer wall so that metal cuttings and the like can be brushed away.

The follower nut 40 is threaded forwardly over the nipple 28 until the sealing member is pressed against the outer wall of the conduit. Thereafter, a wrench is applied to the flat wrench receiving surfaces 58 of the nut, and the same is tightened up against the sealing member until the latter is distorted to assume the shape of the conduit as shown in Figures 1 and 2. It will be apparent that by reason of the length of the junction lines 60 between the wrench engaging surfaces 58 of the follower nut, a maximum gripping surface for the wrench will be provided, yet, at the same time, the provision of this additional wrench-receiving area will not limit the degree of rearward movement of the follower nut on the nipple 28, as said nut can be moved back over the enlargement 50. It will be seen that to have the same wrench-engaging area on a conventional nut, as shown for instance in the application of Mueller et al. mentioned above, the degree of rearward movement of the nut would be limited by the enlargement 50.

With the additional wrench-receiving area provided, no danger of slippage of the wrench is present. As considerable pressure must be exerted by hand in sealing these fittings to a conduit, and as the operation is often performed under confined conditions, the prevention of slipping of the wrench is quite important, not only from the standpoint of protecting the wrench-receiving surfaces but also in the preventing of injury to the operator.

The flange 56 on the follower nut, as shown in Figure 3, provides a complete circular area adapted to engage substantially the entire top of the sealing member as shown in Figures 1 and 2, so that pressure may be evenly applied thereto. This flange extends out beyond the faces 58, and its forward face is smooth and flat throughout the forward end of the nut.

It will be apparent that the various modifications of the construction described herein may be made without departing from the invention.

I claim:

A valve fitting of the class described having an outwardly extending externally threaded tubular nipple adapted to be secured in an opening in the wall of a chamber to make connection for controlling the flow of fluid through the fitting, said fitting having a curved enlargement adjacent the inner end of said nipple, a sealing member surrounding said fitting and adapted to engage the wall of the chamber to seal the union between the nipple and said wall, and a follower nut having an internally threaded surface arranged to be connected to said nipple, said nut having a flat forward force applying end adapted to engage said sealing member to compress the same against the wall of said member when the parts are set up, said nut having its opposite or rear end provided with a concave surface adapted to overlap and engage said enlargement when the nut is backed off away from the wall of the chamber, to insure maximum withdrawal of the nut from the chamber so that the nut and sealing member may be spaced a maximum distance from the chamber to permit access to the wall of the chamber to clean the same when the fitting is initially connected to the chamber and prior to the tightening up of the parts.

JAMES W. SIMPSON.